Patented Oct. 25, 1927.

1,646,782

UNITED STATES PATENT OFFICE.

ROBERT BERLINER, BERTHOLD STEIN, AND WILLY TRAUTNER, OF ELBERFELD, GERMANY, ASSIGNORS TO GRASSELLI DYESTUFF CORPORATION, OF NEW YORK, N. Y., A CORPORATION OF NEW YORK.

GLYOXAL-DIANTHRAQUINONE COMPOUND.

No Drawing. Application filed September 16, 1926, Serial No. 135,985, and in Germany October 30, 1925.

Our invention relates to novel anthraquinone derivatives which are glyoxal-dianthraquinones.

Reduced anthraquinone compounds such as anthrol, or anthrone react easily with aldehydes to form only slightly colored more or less inert substances. We have now found that anthrone:

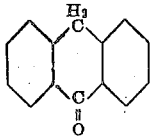

reacts, preferably in an acid medium, with glyoxal $O=CH-CH=O$ in the proportion of two molecules anthrone with one molecule glyoxal to form compounds which according to their behavior and analysis have the formula:

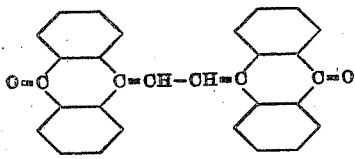

Instead of reacting with glyoxal upon anthrone itself, substituted anthrones can also be used such as alpha-chloranthrone, methylanthrone, etc. Our novel glyoxal-dianthraquinones are yellow to brownish colored difficultly soluble well crystallized substances. They can be reduced with hydrosulfite to form vats from which cotton is dyed yellow fast shades.

The condensation proceeds even by merely heating together the two components, it is however preferred to perform the reaction in presence of an acidic substance such as a free acid or a salt having an acid reaction.

Instead of using glyoxal itself, compounds of same such as the sulfate, its bisulfite-derivatives, sulfuric acid esters or other derivatives which easily decompose into the dialdehyde can be used and the term glyoxal compound as used herein is intended to comprise glyoxal itself as well as such of its derivatives as described above.

The following examples will further illustrate our invention, the parts being by weight.

Example 1:—19.4 parts anthrone are dissolved in about 265 parts glacial acetic acid and 15 parts glyoxal sulfate gradually added while the solution is kept at the boiling temperature. The reaction mass takes a yellowish-brown color and a crystalline, brown precipitate separates. The reaction mass is filtered off after the amount of crystals does not increase any further, the precipitate is washed with glacial acetic acid and hot water. Crystallized from a mixture of nitrobenzene and glacial acetic acid it is obtained as orange-red needles which dissolve in concentrated sulfuric acid with a deep bluish-green color. They represent the glyoxal-dianthraquinone of the probable formula:

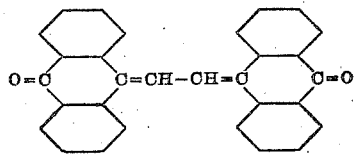

Reduced with a hydrosulfite compound it produces a vat from which cotton is dyed beautiful, clear, fast yellow shades.

Example 2:—25 parts alpha-chloro-anthrone are boiled at reflux with about 370 parts glacial acetic acid and 15 parts glyoxal sulfate. The brownish crystalline condensation product is filtered off and isolated as usual. It is soluble in concentrated sulfuric acid with a dark green color. It represents the glyoxal-di-alpha-chlor-anthraquinone. It forms a vat from which cotton is dyed clear and bright yellow shades.

We claim:

1. The process of producing glyoxal-dianthraquinones which consists in condensing an anthrone compound with a glyoxal compound.

2. The process of producing glyoxal-dianthraquinones which consists in condensing an anthrone compound with a glyoxal compound in presence of an acidic substance.

3. The process of producing glyoxal-dianthraquinones which consists in condensing anthrone with a glyoxal compound.

4. The process of producing glyoxal-dianthraquinones which consists in condensing anthrone with a glyoxal compound in presence of an acidic substance.

5. The process of producing glyoxal-dianthraquinones which consists in heating to boiling temperature a solution of anthrone in glacial acetic acid with glyoxal sulfate.

6. As new products glyoxal-dianthraquinones of the general formula:

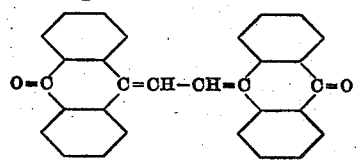

in which the anthraquinone nuclei can be substituted by halogen, particularly chlorine atoms or alkyl groups, which are well crystallized yellowish to brown substances, soluble in concentrated sulfuric acid with from blue to green colors, forming vats from which cotton is dyed yellow, fast shades.

7. As a new product glyoxal-dianthraquinone of the most probable formula:

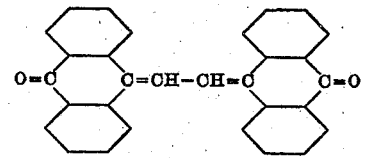

which when recrystallized from a mixture of nitrobenzene and glacial acetic acid forms orange-red needles, soluble in concentrated sulfuric acid with a deep bluish-green color, and forming vats from which cotton is dyed beautiful, clear, fast yellow shades.

In testimony whereof, we affix our signatures.

ROBERT BERLINER.
BERTHOLD STEIN.
WILLY TRAUTNER.